July 8, 1958         MINORU KURIHARA         2,842,081
AUTOMATIC SHUTTLE RACE CLEANER
Filed Sept. 4, 1957
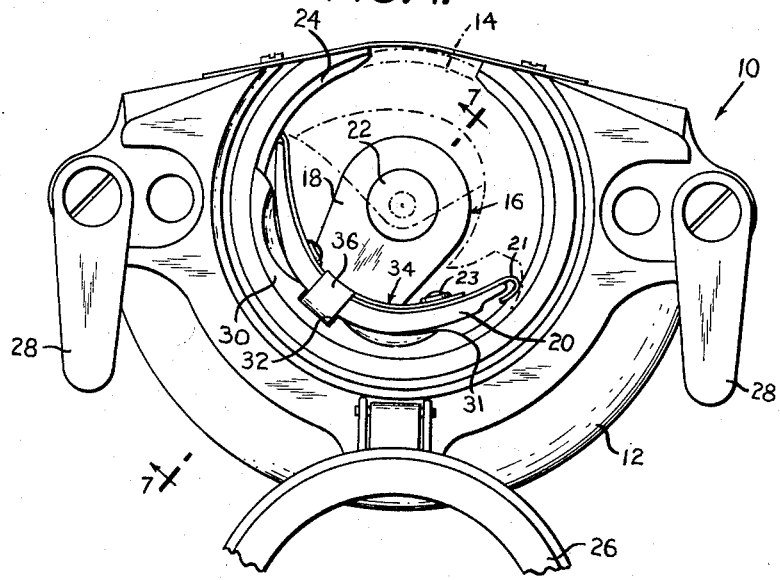
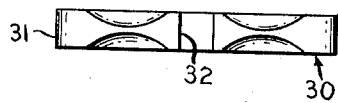
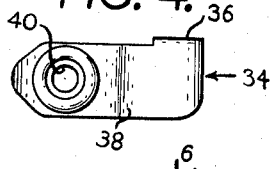
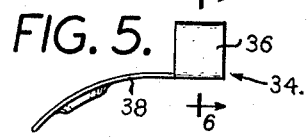
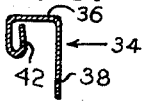
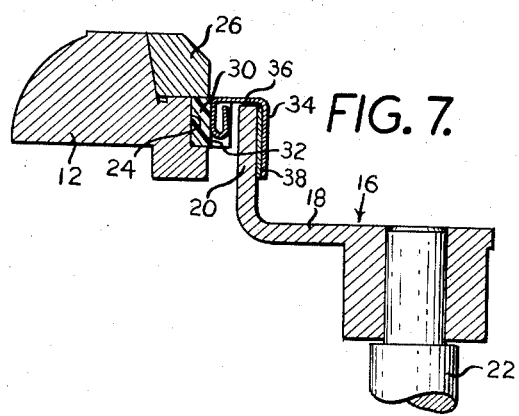
INVENTOR
MINORU KURIHARA
BY
ATTORNEY.

United States Patent Office 2,842,081
Patented July 8, 1958

2,842,081

AUTOMATIC SHUTTLE RACE CLEANER

Minoru Kurihara, Hamazaki-cho, Higashi Matsuura-gun, Saga Prefecture, Japan, assignor to Consolidated Sewing Machine Corp., New York, N. Y., a corporation of New York Application September 4, 1957, Serial No. 682,008

2 Claims. (Cl. 112—192)

This invention relates to an automatic shuttle race cleaner for sewing machines.

The object of this invention is the provision of automatic wiping and cleaning means which operates in connection with a shuttle driver to keep the shuttle race perfectly clean. This device relates mainly to sewing machines with oscillating shuttles. In the normal operation of such machines, lint, dust and other foreign matter tend to accumulate on the shuttle race, necessitating frequent cleaning operations. The present invention provides a wiping element which is mounted on the shuttle driver between said driver and the shuttle race. The oscillating movement of the shuttle driver is translated into a corresponding oscillatory movement of the wiping element. Centrifugal force tends to maintain the wiping element in wiping engagement with the shuttle race. A spring clip is provided to attach the wiping element to the shuttle driver, and this clip applies spring tension to the wiping element which also assists in holding it in wiping engagement with the shuttle race.

An important object of this invention is the quick and simple attaching means by which the wiper is attached to the shuttle driver. As has above been indicated, a spring clip performs this function, and this clip is secured to the shuttle driver by the very same screw which normally attaches the shuttle driver spring to the shuttle driver.

The invention is illustrated in the accompanying drawing, in which:

Fig. 1 is a face view of the shuttle driving mechanism, showing the wiper herein claimed and the clip by which it is fastened to the shuttle driver.

Fig. 2 is a side view of the wiper element.

Fig. 3 is a view of the inner periphery thereof.

Fig. 4 is one side view of the fastening clip.

Fig. 5 is another side view of said clip.

Fig. 6 is a transverse section through the clip on the line 6—6 of Fig. 5.

Fig. 7 is a sectional view through the entire mechanism on the line 7—7 of Fig. 1.

The shuttle drive mechanism 10 shown in the drawing is intended to be merely illustrative of the many oscillatory shuttle drive mechanisms used in sewing machines. It is provided with a shuttle race body 12, which is adapted to receive a shuttle 14. The shuttle drive mechanism includes a shuttle driver assembly 16 which is mounted on a shaft 22. The shuttle driver assembly consists of a bracket 18, including a hub which is mounted on a reduced portion of said shaft and a shuttle driver proper 20, including a shuttle driver spring 21 secured to the shuttle driver by means of a pair of screws 23.

Shuttle race 24 is formed in the shuttle race body 12, as Fig. 7 clearly shows. A shuttle race cover ring 26 is provided to cover the shuttle race, and latches 28 are provided to hold the cover ring in closed position. This is conventional.

The wiper element 30 is best shown in Figs. 2 and 3. It is arcuate in shape and is made preferably of molded plastics. This is indicated in Fig. 7. The ends 31 of wiper 30 are blade- or chisel-sharp, but are beveled only along the inner periphery of the wiper. These ends 31 function in the manner of scraping blades and are well adapted to scrape or wipe any foreign matter off the shuttle race. Both ends perform this function, since the wiper engages in oscillatory movement.

Although wiper 30 has above been described as being arcuate in shape, it will be understood that, while this general shape is preferred, what is really essential is that the ends 31 be disposed against the race, irrespective of whether the main body of the wiper is so disposed. These ends are the effective portions of the wiper, and the precise shape of the main body of the wiper, except as generally shown, is not critical.

It will now be observed that a notch or recess 32 is formed transversely of wiper 30, centrally thereof and on its inner periphery. This notch enables the wiper to receive clip 34, which is the means by which the wiper is attached to the shuttle driver. More specifically, the clip consists of a curved spring portion or shank 38, a bridge 36 projecting laterally therefrom, and a looped end portion 42 which depends from said bridge 36. It is the looped end portion 42 which seats within notch 32 and functions in the manner of a key relative to the wiper.

As clearly appears in Figs. 1 and 7, in the assembly of this device curved shank 38 is disposed against the inner periphery of shuttle driver spring 21. The bridge 36 extends across said spring and across shuttle driver 20, and looped end portion 42 then projects inwardly into notch 32 of the shuttle race wiper. It will now be observed that a hole 40 surrounded by an embossed ring is formed in shank 38, and it will be seen that this hole is adapted to receive one of the screws 23 which secure the shuttle driver spring 21 to the shuttle driver 20. This holds the clip in place, and the clip in turn holds the wiper in place. In addition to the clip performing the function of retaining the wiper in place, there is also a shuttle race cover ring 26 which prevents lateral dislodgment of said wiper. See Fig. 7.

As has above been indicated, centrifugal force applied to the wiper will keep its end portions 31 in wiping engagement with the shuttle race. But in addition to this it will be understood that shank 38 of the retaining clip may be endowed with spring tension enabling it to exert a radially outward force upon the wiper through bridge 36 and looped end portion 42. As a matter of fact, the looped end portion itself may also exert spring tension against the wiper.

The foregoing is illustrative of a preferred form of this invention, and it will be understood that this preferred form may be modified and other forms provided, within the broad spirit of the invention and the broad scope of the claims.

I claim:

1. A sewing machine shuttle mechanism, comprising a shuttle, a shuttle race, an oscillatory shuttle drive mechanism wherein a shuttle driver is oscillated in an arcuate path concentric with said shuttle race, and a shuttle race wiping means, said shuttle race wiping means comprising a wiper which is disposed between the shuttle driver and the shuttle race and is provided with relatively sharp end portions which are disposed in wiping engagement with said race, a clip engaging said wiper and means securing said clip to said shuttle driver, whereby the oscillatory movement of the shuttle driver is translated into a corresponding oscillatory movement of the wiper, enabling its relatively sharp end portions to wipe the shuttle race clean, said clip being provided with a shank which is disposed against the shuttle driver, said securing means by which the clip is secured to the shuttle driver being a screw by which said shank is secured to the inside of said shuttle driver, said clip being provided with a bridge which extends across the shuttle driver, and a detent projecting from said bridge into engagement with the wiper, said shank of the clip being generally arcuate in shape and being provided with spring tension which is asserted through the bridge and the detent against the wiper to maintain the wiper in wiping engagement with the shuttle race.

2. A sewing machine shuttle mechanism, comprising a shuttle, a shuttle race, an oscillatory shuttle drive mechanism wherein a shuttle driver is isolated in an arcuate path concentric with said shuttle race, and a shuttle race wiping means, said shuttle race wiping means comprising a wiper which is disposed between the shuttle driver and the shuttle race and is provided with relatively sharp end portions which are disposed in wiping engagement with said race, a clip engaging said wiper and means securing said clip to said shuttle driver, whereby the oscillatory movement of the shuttle driver is translated into a corresponding oscillatory movement of the wiper, enabling its relatively sharp end portions to wipe the shuttle race clean, said clip being provided with a shank which is disposed against the shuttle driver, said securing means by which the clip is secured to the shuttle driver being a screw by which said shank is secured to the inside of said shuttle driver, said clip being provided with a bridge which extends across the shuttle driver, and a detent projecting from said bridge into engagement with the wiper, the detent of the clip being a looped element which exerts a spring action against the wiper to maintain the wiper in wiping engagement with the shuttle race.

References Cited in the file of this patent

UNITED STATES PATENTS

| | | |
|---|---|---|
| 1,346,183 | Denne | July 13, 1920 |

FOREIGN PATENTS

| | | |
|---|---|---|
| 573,254 | Germany | Mar. 29, 1933 |
| 441,040 | Great Britain | Jan. 10, 1936 |
| 423,458 | Italy | July 17, 1947 |